United States Patent [19]

Birkenbach

[11] Patent Number: 4,566,277
[45] Date of Patent: Jan. 28, 1986

[54] PRESSURIZED FLUID SUPPLYING ARRANGEMENT PARTICULARLY A MASTER CYLINDER OF A CLUTCH

[75] Inventor: Alfred Birkenbach, Hattersheim, Fed. Rep. of Germany

[73] Assignee: ITT Industries, Inc., New York, N.Y.

[21] Appl. No.: 365,208

[22] Filed: Apr. 5, 1982

[30] Foreign Application Priority Data

May 21, 1981 [DE] Fed. Rep. of Germany ....... 3120272

[51] Int. Cl.⁴ .......................... B60T 11/26; F15B 7/08
[52] U.S. Cl. ........................................ 60/587; 60/585; 60/589; 60/591
[58] Field of Search ................. 60/589, 591, 585, 587, 60/586

[56] References Cited

U.S. PATENT DOCUMENTS

| | | | |
|---|---|---|---|
| 2,232,349 | 2/1941 | Swift | 60/589 |
| 2,525,740 | 10/1950 | Trevaskis | 60/589 |
| 2,580,851 | 1/1952 | Seppmann | 60/585 |
| 3,044,268 | 7/1962 | Harrison | 60/586 |

FOREIGN PATENT DOCUMENTS

| | | | |
|---|---|---|---|
| 636348 | 2/1962 | Canada | 60/589 |
| 710044 | 8/1931 | France | 60/585 |

Primary Examiner—Michael Koczo
Assistant Examiner—Randolph A. Smith
Attorney, Agent, or Firm—James B. Raden

[57] ABSTRACT

An arrangement for supplying pressurized fluid into a user circuit, particularly a master cylinder of a clutch, includes a cylinder housing defining a bore. A cylinder sleeve is slidably accommodated in the bore and bounds an external feeding compartment with the housing, as well as an internal pressure chamber. A piston is received in the pressure chamber for displacement in the axial direction of the arrangement in response to the application of an external force, especially that of a clutch pedal, thereto, to exert pressure on the fluid present in the pressure chamber. The sleeve has a connecting port at its end remote from the point of application of the external force, and the housing has an auxiliary port communicating with an auxiliary reservoir and a supply port which communicates with the user circuit. In an inactive position of the sleeve which is assumed when the piston is not subjected to any external force, the connecting and supplying ports communicate with the feeding compartment, and the auxiliary port is in permanent communication with the feeding compartment. Upon application of the external force, the sleeve is displaced into its active position in which a valve device containing a valve element carried by the sleeve and a valve seat provided on the housing and surrounding the connecting and supplying ports, respectively, interrupts communication between such ports and the feeding compartment, while communication of such ports with one another is maintained.

14 Claims, 3 Drawing Figures

PRESSURIZED FLUID SUPPLYING ARRANGEMENT PARTICULARLY A MASTER CYLINDER OF A CLUTCH

BACKGROUND OF THE INVENTION

The present invention relates to a pressurized fluid supplying arrangement in general and more particularly to an arrangement of this type which is particularly suited for use as a master cylinder of a clutch.

In conventional clutch master cylinders, there is provided a cylinder housing including an axial bore for accommodation of a piston. The piston has one end face delimiting a pressure compartment while an actuating rod extending to a clutch pedal engages its opposite end face. The housing has a clutch slave-cylinder port and a feed bore leading to a supply reservoir. This feed bore can be closed by a valve upon actuation of the piston. A cylinder sleeve is located between the outer circumferential surface of the piston and the surface bounding the axial bore of the housing. The sleeve slidably receives the piston. A feeding compartment is formed between the surface bounding the bore and the outer surface of the sleeve. The feed bore communicates with the feeding compartment.

A clutch master cylinder of this type is known from the British Pat. No. 1,481,612. In this master cylinder construction, the cylinder sleeve is stationarily arranged in the axial bore of the cylinder housing. The connection from the feeding compartment, which is formed between the housing and the cylinder sleeve, to the slave-cylinder port is established in this master cylinder construction through an intermediate chamber which is located behind the actual cylinder housing and is closed by a rolling diaphragm, as well as through passageways which extend through the piston and are adapted to be closed by a valve inserted at the piston end face which delimits the pressure chamber. The intermediate chamber which is closed by the rolling diaphragm and which has to be provided in addition to the other components renders the structure of the cylinder housing in the known clutch master cylinder very complicated. The same applies to the design of the piston which is required to accommodate, in addition, to the passageways leading to the pressure compartment, also an actuating device for the valve. Finally, the valve itself which is mounted at the face of the piston is also of a relatively complicated design.

SUMMARY OF THE INVENTION

Accordingly, it is a general object of the present invention to avoid the disadvantages of the prior art.

More particularly, it is an object of the present invention to provide a pressurized fluid supplying arrangement which does not possess the disadvantages of the conventional arrangements of this type.

Still another object of the invention is to so construct the arrangement of the type here under consideration as to be particularly suited for use as a master cylinder of a clutch.

It is yet another object of the invention to develop an arrangement of the above type which is simple in construction, inexpensive to manufacture, and reliable in operation, nevertheless.

In pursuance of these objects and others which will become apparent hereafter, one feature of the present invention resides in an arrangement for supplying pressurized fluid into a user circuit, particularly a master cylinder for supplying hydraulic fluid into a circuit leading to a slave cylinder of a clutch, in response to the application of an external force, especially a clutch pedal force, thereto, comprising a cylinder housing defining a bore having an axis; a cylinder sleeve sealingly accommodated in the bore for movement axially thereof between an inactive and an active position and bounding an external feeding compartment with the housing, and an internal pressure chamber; a piston sealingly received in the pressure chamber for axial displacement relative to the sleeve and having an end face delimiting a pressure compartment in the pressure chamber; means for applying the external force to the piston for displacing the same in the pressure chamber and for thus applying pressure to the fluid present in the pressure compartment; means for forming a connecting port in the sleeve for communicating the pressure compartment with the feeding compartment; means for defining in the housing a supplying port for supplying the fluid from the interior of the housing into the user circuit, and an auxiliary pressure port communicating with the feeding compartment; an auxiliary fluid reservoir communicating with the auxiliary pressure port; valve means on the sleeve and on the housing for respectively establishing and interrupting communication via the feeding compartment between the auxiliary pressure port and the supplying port in the inactive and active positions of the sleeve; and means for urging the sleeve toward the active position thereof in response to the displacement of the piston.

Advantageously, the supplying port of the housing and the connecting port of the cylinder sleeve are located opposite to each other around the longitudinal axis of the cylinder housing.

In this arrangement, the valve element will be advantageously formed by an end face of the cylinder sleeve, and the end face of the cylinder housing which bounds the supplying port constitutes a valve seat for the valve element. In accordance with a further facet of the invention, the valve seat includes an elastic seat element which encloses the supplying port.

In another embodiment advantageous construction according to the present invention, a sealing cup is mounted at the end face of the cylinder sleeve.

To retain the cylinder sleeve in its inactive or open position, there is advantageously provided a spring which is preferably inserted in the feeding compartment formed between the cylinder sleeve and surface bounding the axial housing bore.

According to another advantageous aspect of the invention, the slave-cylinder or supplying port has a portion extending radially into the cylinder housing. This makes it possible to arrange the supply reservoir in a very expedient way as an axial extension of the cylinder housing.

In still another construction of the present invention, the cylinder housing includes means for guiding the cylinder sleeve.

If the slave cylinder is designed without a spring but with a diaphragm, a pilot valve which will then be required is located suitably at the end face of the cylinder sleeve opposite the point of introduction the external force.

To be able to adjust the stroke of the valve in an easy way, there is provided in accordance with a further concept of the present invention a nut threaded into the end of the axial bore.

BRIEF DESCRIPTION OF THE DRAWING

Above-mentioned and other features and objects of this invention will become more apparent by reference to the following description taken in conjunction with the accompanying drawings, in which.

DETAILED DESCRIPTION OF THE PREFERRED EMBODIMENTS

Figure 1:
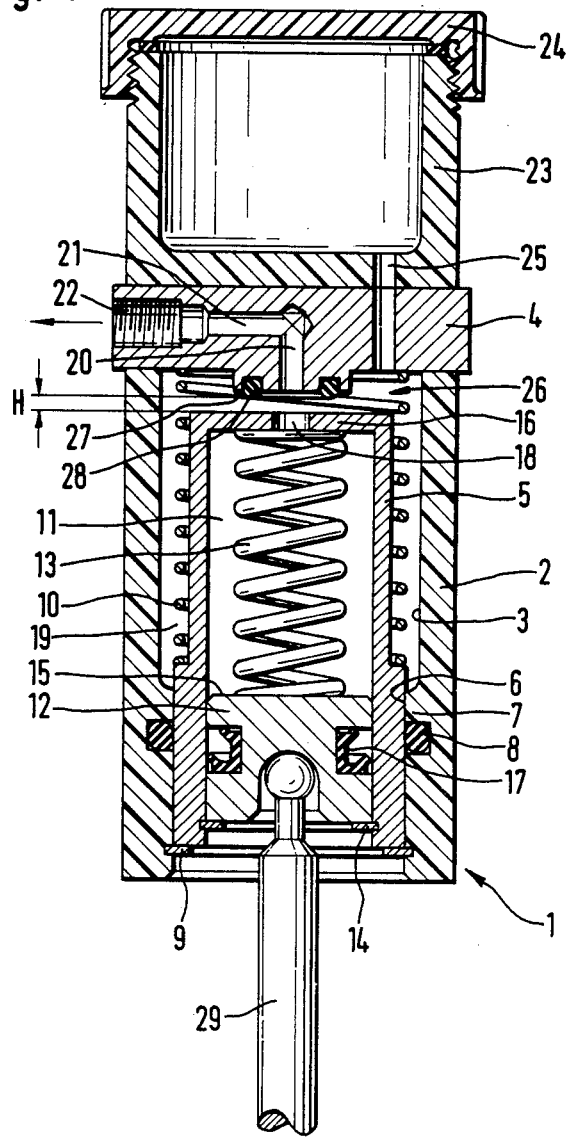
FIG. 1 is a cross-sectional view of a clutch master cylinder in accordance with the present invention.

Referring now to the drawing in detail, and first to FIG. 1 thereof, it may be seen that a clutch master cylinder 1 includes a cylinder housing 2 having an axial bore 3 in which is open at its one end, while its other end is closed by an end wall. A cylinder sleeve 5 is located in the axial bore 3 for axial sliding therein.

The cylinder sleeve 5 is guided in the bore 3 on a guiding section 6 which is formed by a narrowed portion of the axial bore 3 formed by a reinforcing wall portion 7 of the cylinder housing 4. Inserted between the cylinder sleeve 5 and the guiding section 6 is a sealing ring 8 which is seated in a groove of the reinforced wall portion 7 but which may also be seated in a corresponding groove of the cylinder sleeve 5. The extent of motion of the cylinder sleeve 5 in the axial bore 3 is limited by a stop which is constituted in this construction by a split lock ring 9 arranged in the bore 3. A compression spring 10, which is located in a feeding compartment 19 located intermediate the cylinder sleeve 5 and the surface bounding the axial bore 3, urges the cylinder sleeve 5 against the split lock ring 9.

The interior of the cylinder sleeve 5 forms a pressure chamber 11 having axially slidably arranged therein a piston 12 which is urged into an end position by a compression spring 13 which is also inserted in the pressure chamber 11, this end position being defined by a shoulder 14 provided at the end of the cylinder sleeve 5. The compression spring 13 abuts at its one end at the end face 15 of the piston 12 which delimits the pressure chamber 11, while its other end abuts against an end wall 16 which delimits the interior of the cylinder sleeve 5 on the other side. A seal 17 is arranged between the piston 12 and the inner wall of the cylinder sleeve 5.

At its end wall 16, the cylinder sleeve 5 contains a central bore or connecting port 18 which extends into the feeding compartment 19 formed between the cylinder sleeve 5 and the surface bounding the axial bore 3. Arranged opposite the connecting port 18 is a central bore 20 in the end wall 4 which is connected to a radial bore 21. Together the bores 20 and 21 constitute a slave-cylinder or supplying port 22.

A supply reservoir 23 having substantially the same diameter as the cylinder housing 2 is located in the continuation of the cylinder housing 2. The supply reservoir 23 is closed by a cap 24. A feed bore or auxiliary pressure port 25 extends from the supply or auxiliary fluid reservoir 23 through the end wall 4 into the feeding compartment 19. A valve 26 is provided for separating the supplying port 22 from the feeding compartment 19. This valve 26 is formed by a valve seat 27 provided at the end wall 4 and by the end wall 16 of the cylinder sleeve 5 which is configured as a valve element. An elastic seal element 28 is arranged around the central bore 20 at the valve seat 27.

The mode of operation of the clutch master cylinder 1 shown in FIG. 1 will now be briefly described starting from the illustrated position in which the valve 26 is in its open or inactive position.

In this position, pressure fluid can flow from the supply reservoir 23 via the auxiliary port 25 into the feeding compartment 19 and from where there both into the pressure chamber 11 formed in the interior of the cylinder sleeve 5 and into the slave-cylinder or supplying port 22. When the piston 12 is now displaced in the direction of the end wall 4 by means of an actuating rod 29 which acts on the piston 12 and extends to a clutch pedal which is not shown, the force of the compression spring 13 overcomes that of the compression spring 10 and urges the cylinder sleeve 5 which is effective as a valve element, against the valve seat 27. In this manner, the connection between the pressure chamber 11 and the supply or auxiliary rsservoir 23 is interrupted in this active position of the sleeve 5.

However, connection is still established between the pressure chamber 11 and the slave-cylinder port 22, since the central bore 20 in the end wall 4 is located opposite the central bore 18 in the cylinder sleeve 5. The pressure generated in the pressure chamber 11 by the piston 12 will thus be transmitted via the bore 18 to the bores 20 and 21 of the slave-cylinder port 22 and from there via a conduit which is not shown to one or to several slave cylinders which also are not shown. When the pressure applied to the clutch pedal decreases, the compression spring 13 will urge the piston 12 back into its initial position in which it abuts the shoulder 14 of the cylinder sleeve 5. After that, the compression spring 10 urges the cylinder sleeve 5 into its initial or inactive position in which it abuts against the split lock ring 9 so that the valve 26 re-opens.

Figure 2:
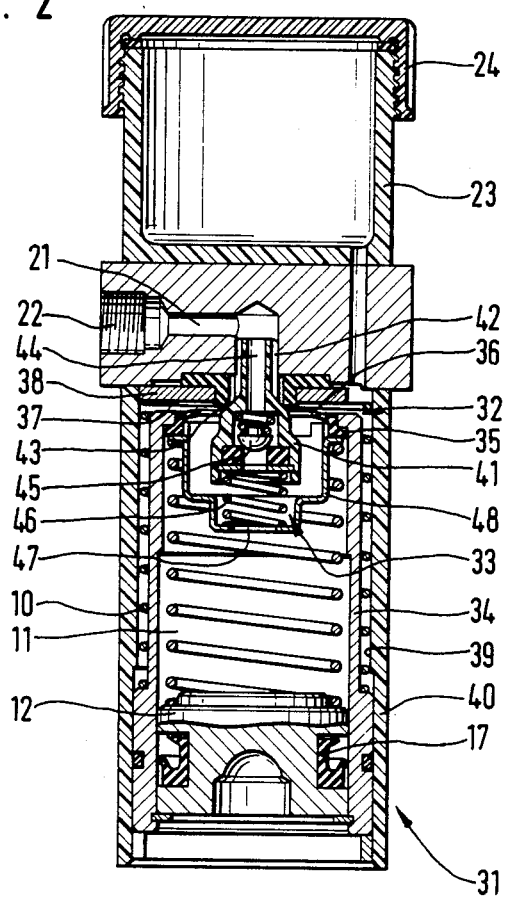
FIG. 2 is a view similar to FIG. 1 but of a clutch master cylinder having a different overflow valve and an additional pilot valve.

A clutch master cylinder 31 illustrated in FIG. 2 differs from the clutch master cylinder 1 of FIG. 1 basically only in that a different valve 32 and an additional pilot valve 33 are provided. Even in the valve 32, the movable valve element is formed by a cylinder sleeve 34. However, in contrast to the valve 26 of FIG. 1, closure relative to the valve seat is ensured by means of a sealing cup 35 seated in an opening of the cylinder sleeve 34 and moving with its lip 36 in abutment with a flat valve seat 37 which is formed by an end wall 38 surrounding an axial bore 39 of a cylinder housing 40.

The pilot valve 33 will be required only in the event that the slave cylinder, which is not shown, is designed without a spring but with a diaphragm. In this case, the pilot valve 33 guarantees that the fluid present in the conduits is permanently subjected to elevated pressure even when the clutch is not actuated, so that the slightest increase in the pressure upon actuation will initiate an instant clutch effect.

The pilot valve 33 includes a valve element 41 which cooperates with a valve seat 43 provided at a central bore 42. The central bore 42 terminates in the radial bore 21 which forms a part of the slave-cylinder port 22, in the same manner as in the construction of FIG. 1. The valve element 41 contains a passageway 44 which is closed by another valve element 45 loaded in the closing direction. The valve element 41 is urged toward the valve seat 43 by a spring 46 which acts against a bowl 48 arranged in the interior of the cylinder sleeve 34 and provided with a passageway 47.

The mode of operation of the clutch master cylinder 31 shown in FIG. 2 generally corresponds to that of the clutch master cylinder 1 shown in FIG. 1. In contrast hereto, the supply reservoir 23 communicates with the slave-cylinder port 22 in the clutch master cylinder 31 via the passageway 44 which is closed by the second valve element 45 of the pilot valve 33.

The circumferential walls of the cylinder housings 2, 40 of the clutch master cylinders 1, 31 may consist of plastics, since the pressure which develops in the pressure fluid upon actuation of the clutch is received by the cylinder sleeve 5, 34 which is preferably made of metal. The cylinder housing 2, 40 is loaded substantially only by the axial actuating force. Fastening flanges which have to be provided under certain circumstances will be suitably arranged at the area of the end wall 4, 38 of the cylinder housing 2, 40 which is made of metal.

During the assembly of the clutch master cylinder, the part of the clutch master cylinder comprising the piston 12, the actuating rod 29 and the cylinder sleeve 5 or 34 can be preassembled and then inserted into the axial bore 3, 39 of the cylinder housing 2, 40.

Figure 3:
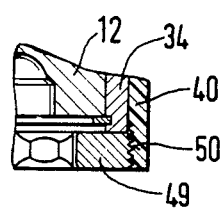
FIG. 3 is a fragmentary sectional view of an adjusting device for the valve of the clutch master cylinder.

To be able to adjust the stroke H of the slave or valve 26 or 32, instead of using the snap ring 9, a nut 49 can be screwed in the end of the axial bore 39 that is provided with an internal thread 50, as is illustrated in FIG. 3.

The supply reservoir 23 does not necessarily have to be integral with the cylinder housing 2, 40, as is shown in FIGS. 1 and 2. When the supply reservoir is arranged separately, the supply reservoir port 36 may extend either axially or radially into the feeding compartment 19 which accommodates the compression spring 10.

While I have described above the principles of my invention in connection with specific apparatus it is to be clearly understood that this description is made only by way of example and not as a limitation to the scope of my invention as set forth in the objects thereof and in the accompanying claims.

I claim:

1. An arrangement for supplying pressurized fluid into a user circuit, particularly a master cylinder for supplying hydraulic fluid into a circuit leading to a slave cylinder of a clutch, in response to the application of an external force, especially a clutch pedal force, thereto, comprising
   a cylinder housing defining a bore having an axis;
   a cylinder sleeve sealingly accommodated in said bore for movement axially thereof between an inactive and an active position and bounding an external feeding compartment with said housing, and an internal pressure chamber;
   a piston sealingly received in said pressure chamber for axial displacement relative to said sleeve and having an end face delimiting a pressure compartment in said pressure chamber;
   means for applying the external force to said piston for displacing the same in said pressure chamber and for thus applying pressure to the fluid present in said pressure compartment;
   a connecting port in one axial end of said cylinder sleeve remote from said piston for communicating said pressure compartment with said feeding compartment when said cylinder sleeve is in an inactive position, said connecting port being in communication with a supplying port for supplying fluid from said pressure chamber into the user circuit in the active position of said sleeve;
   an auxiliary pressure port interconnecting said feeding compartment
   with an auxiliary fluid reservoir for supply of fluid from said reservoir via said feeding compartment through said connecting port into said pressure chamber in the inactive position of said sleeve;
   valve means on said sleeve and on said housing for respectively establishing and interrupting communication via said feeding compartment between said reservoir and said pressure chamber in said inactive and active positions of said sleeve; and
   means for urging said sleeve toward said active position thereof in response to the displacement of said piston.

2. The arrangement as defined in claim 1, wherein said connecting port and said supplying port are in axial registry with one another; and wherein
   said valve means surrounds said connecting and supplying ports to interrupt, in said active position, communication of the pressure compartment via said connecting port with said feeding compartment while permitting direct fluid flow between said connecting and supplying ports.

3. The arrangement as defined in claim 2, wherein said supplying and connecting ports are disposed around said axis of said housing bore.

4. The arrangement as defined in claim 1, wherein said valve means includes an axial end surface of said sleeve, and an axially registering end surface of said housing.

5. The arrangement as defined in claim 4, wherein said valve means further includes a resiliently yieldable annular sealing element connected to one of said housing and sleeve and surrounding said supplying and connecting ports in said active position of said sleeve.

6. The arrangement as defined in claim 4, wherein said valve means includes a cup-shaped sealing member secured to said sleeve around said connecting port and having a portion interposed between said end surfaces.

7. The arrangement as defined in claim 1, and further comprising
   means for biasing said sleeve towards its inactive position, including a spring interposed between said housing and said sleeve.

8. The arrangement as defined in claim 7, wherein said spring is accommodated in said feeding compartment.

9. The arrangement as defined in claim 1, wherein said supplying port has at least a portion which extends substantially in the radial direction of said housing.

10. The arrangement as defined in claim 1, wherein said auxiliary fluid reservoir forms an axial extension of said housing.

11. The arrangement as defined in claim 1, and further comprising
    means on said housing for guiding said sleeve for said axial movement thereof.

12. The arrangement as defined in claim 1, and further comprising
    a pilot valve at the end of said sleeve remote from said piston.

13. The arrangement as defined in claim 1, and further comprising
    means for adjusting the extent of axial stroke of said sleeve within said bore of said housing, including an internally threaded portion of said housing, and an externally threaded limiting nut threaded into said internally threaded portion of said housing.

14. The arrangement as defined in claim 1, wherein said auxiliary pressure port extends through said housing in a direction substantially parallel to said axis of said bore.

* * * * *